Figure 1:
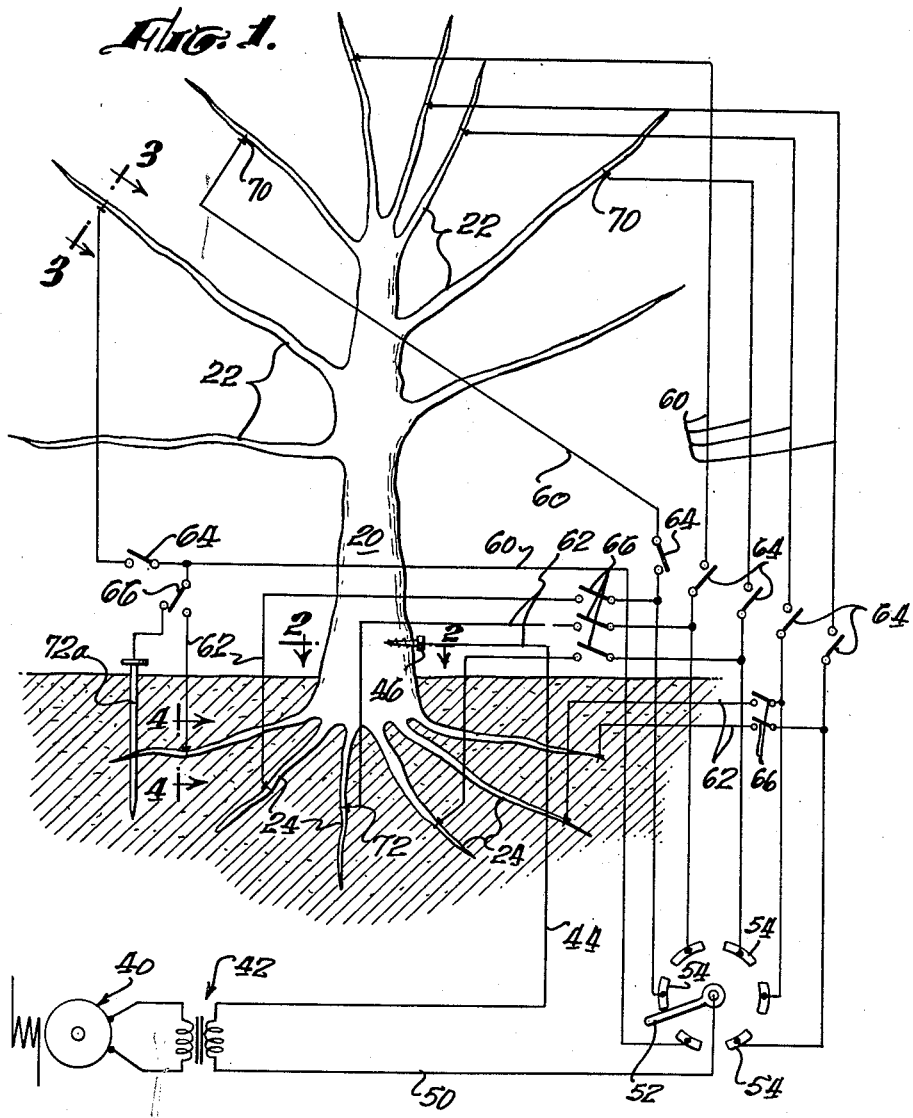

Feb. 11, 1964

C. R. KELLER 3,120,722

PLANT TREATING SYSTEM

Filed Aug. 29, 1960

INVENTOR.
CHARLES R. KELLER,
BY
Barkelew & Lewis 3,120,722
PLANT TREATING SYSTEM
Charles R. Keller, 41 Palm Court, Santa Paula, Calif.
Filed Aug. 29, 1960, Ser. No. 52,461
1 Claim. (Cl. 47—1.3)

The present invention has to do with treatment for rehabilitation and cure of certain diseases of plants, more particularly of plants of the woody type of trees and shrubs—plants typically having stems, or trunks, limbs and roots with outer casings of bark or sheath and inner living cambium and young sap-wood, alburnum or phloem layers surrounding the dead heart wood.

It is understood generally (Britannica, 11th ed.) that the life and growth processes of such plants are carried on through such cambium and sap-wood layers, which are living, in contradistinction to the bark and inner heartwood; that those layers, or particularly the cambium, carry on the production of the phloem and xylem, giving rise to new bark and wood tissues, and carry on the active functions of the xylem and the function of water conduction.

According to recent investigations reported in an article in the Scientific American of February 1959 at page 44, the living cambium layer typically lies between an outer living phloem layer and an inner dead xylem layer which is next the heartwood. Water and minerals travel up through the cells of the dead xylem layer; sugars and various other substances move in both directions through, and are stored in, the live cells of the phloem layer.

It appears that the health and growth of e.g. a tree depend on the processes of the living layers; and that therefore anything, such for instance as virus, infecting them may inhibit growth and productiveness and eventually cause death.

The system of my invention applies electrical treatment to those living layers of the stem, branches and/or roots of such plants, and also in some cases to the soil around the roots, with the result of curing and rejuvenating the plants from various common diseases, as set out below. Those layers are, in comparison with dry heartwood and bark, relatively electrically conductive, so that current flow can be largely confined to them for effective results.

In typical applications of my system, I set up current flow through those living layers of the stem, and branches and/or the roots, the latter collectively referred to here as stem divisions. In a preferred form of my system, through opposite terminals applied directly to those layers, I set up current flow longitudinally through the layers, intermittently through the stem divisions and constantly through the stem. Preferably I utilize an interrupted current of relatively high frequency—e.g. alternating current—and at relatively high voltage. The only upper limit on voltage is that which might injure or destroy the plant, or its living layers.

The following descriptions of typically preferred procedures are illustrative of the invention, reference being had to the accompanying schematic drawings, in which:

FIG. 1 is a schematic illustrating the application of the system to a tree; and

Figure 2:
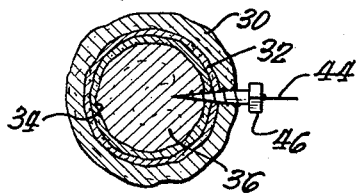
Figure 3:
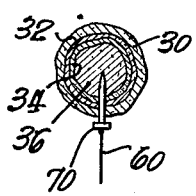
Figure 4:
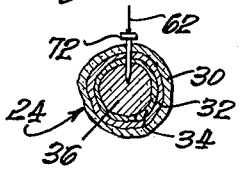

FIGS. 2, 3 and 4 are schematic sections on lines 2—2, 3—3, and 4—4, of FIG. 1.

In the drawings a typical tree is shown with trunk or stem 20, branches 22 and roots 24; and the sections of FIGS. 2, 3 and 4 show schematically the outer bark or sheath 30, the next inner phloem layer 32, and the next cambium layer 34, of the trunk, limbs and roots; surrounding the inner heartwood 36, the outer layer of which carries the dead xylem cells.

In schematics, an A.C. generator is indicated at 40 with its output going to transformer 42. From one side of the transformer secondary a line 44 is shown leading to a conductive terminal 46 which penetrates through at least one or both living layers to afford electrical connection with them. That terminal is here shown as a heavy lag screw.

The other side of the transformer secondary is shown as going via conductor 50 to the central rotative contact arm 52 of a distributor having, say, six contacts 54 to be successively contacted by the rotating arm to distribute the transformer output. The distribution from the distributor may go to either several of the upper tree limbs and/or to several of the roots, or, as described below, to the soil around the roots. As shown schematically in FIG. 1 the lines 60 lead from distributor contacts 54 to upper locations on several upper limbs; and lines 62 to lower parts of several roots. Switches 64 and 66 are shown controlling these lines, so that current may be fed to either the limbs or roots, or both.

Lines 60 to the limbs connect to conductive terminals 70, and lines 62 to the roots to terminals 72. These terminals may conveniently be, and are here shown as, nails or spikes driven through at least one or both living layers to make contact with them.

I have in numbers of instances successfully treated avocados for what is known as canker, and orange trees for scaly bark (scaling of bark) and "dieback" (dying down from the tops). In substantially all these cases the plant was producing little or no fruit, the terminal parts of the branches were apparently dead, and the whole plant with little or no new sprouts in the spring. These treatments were usually applied in the spring; with A.C. at either 500 or 800 cycles per second and at about 6500–6600 volts. Total time period of treatment has been varied, depending on the size and condition of the plant; with the current distributed to the several (usually six) limp tops or root bottoms, by the distributor. The function and purpose of the distributor is to distribute the full current flow successively to the living layers of the several limbs and/or roots. The rotary speed of the distributor is such—say one hundred-fifty revolutions per minute—that the current flow is more or less evenly distributed to the several limbs and/or roots during a typical single treatment time of say, fifteen or twenty minutes. Using the figures here given, that means that each of six limbs and/or roots has the current flowing through its living layers for, say, two and one-half minutes; while the more extensive layers of the stem or trunk receive the current flow for, say, fifteen minutes; during each treatment. In typical treatments of large orange and avocado trees, the treatments have been repeated on succeeding days, to total treatment times of from an hour up to as much as five hours or so on very large trees.

In addition to electrically treating the living layers of the plant, I have also, in typical cases, electrically treated the ground under the plant and around the roots. This has been done, for example, by driving heavy spikes, such as shown at 72a, into the soil around the roots and applying the distributed current of lines 62 to them, with the single return line 44 connected into the living layers of the trunk. This modified or additional treatment puts the treating current through the soil to the roots and thence through them and the living layers to such a return terminal as 46. If such treatment is additional to that applied to the limbs and/or roots, it may be electrically fed from the same source 40, 42, 52, 54, or from a duplicate of that source system.

In all cases mentioned above, in the following spring the treated plants showed marked new growth, fresh sprouts, enlivening of the apparently dead limbs, setting of new fruit, sometimes heavily, and growth of new smooth bark displacing the previous scaley bark. In some cases, treatments repeated in the following spring have proved beneficial.

I believe the effectiveness of my treatment system depends primarily on the fact that deleterious plant infections take place in one or both of the two living layers; and that electrical current flow through those relatively conductive layers destroys and/or controls infections such as virus. The applied voltages are not limited to those here illustratively given. They may be higher, within limit of immediate injury to the plant; in which case the total time of treatment may be shorter. Or they may be lower with longer treatment times.

In my typical treatment of an orange tree of average size, the distance between the branch terminals 70 and trunk terminal 46 may be of the order of approximately ten feet. Using the typical stated voltages, the average voltage gradient lengthwise through the living layers is then of the order of six hundred fifty volts per foot. At such a spacing and voltage gradient on a typical orange tree, the current flow through those layers has apparently been of the order of 0.15 ampere. With higher voltages and/or gradients, as for instance in applications to smaller plants, the treatment times may be shortened; or the voltages correspondingly reduced to maintain the same gradient.

I claim:

The herein described method of treating tree-like plants for rejuvenation against infections; said method including the steps of establishing electrical contacts with at least one of the living layers of a plant at points separated lengthwise of those layers, said contact establishments including a contact in the living layer of the plant trunk and several respectively in the living layers of several of the trunk divisions, applying one of two opposite terminals of an active alternating current electrical circuit, of frequency of the order of at least 800 cycles per second, continuously to the trunk contact, and applying the other of the two opposite terminals in distributive sequence intermittently to each of the trunk division contacts, the terminal voltage of said circuit being at least of the order of 6500 to 6600 volts and the lengthwise spacing of the oppositely connected contacts being such as to obtain a voltage gradient through the living layers of at least approximately 650 volts per foot, thereby causing constant current flow through the living layer of the trunk during the period of treatment together with distributed intermittent current flow through the several trunk divisions.

References Cited in the file of this patent
UNITED STATES PATENTS

| | | |
|---|---|---|
| 779,791 | Lokuciejewsky | Jan. 10, 1905 |
| 782,181 | Squier | Feb. 7, 1905 |
| 1,146,212 | Sullivan | July 13, 1915 |
| 2,007,879 | Sefton | July 9, 1935 |
| 2,223,813 | Brown | Dec. 3, 1940 |

FOREIGN PATENTS

| | | |
|---|---|---|
| 766,755 | France | Apr. 23, 1934 |
| 320,470 | Great Britain | Oct. 17, 1929 |
| 37,938 | Hungary | Feb. 5, 1907 |
| 542,868 | Italy | May 7, 1956 |
| 35,623 | Switzerland | Jan. 23, 1906 |

OTHER REFERENCES

"Destructive and Useful Insects" (Metcalf), second edition, published by McGraw-Hill (New York), 1939, page 294 relied on.

Chemical Engineers' Handbook, second edition, New York, McGraw-Hill, 1941, pages 2712 and 2713.

"John Deere Model (H) Tractor-Drawn Spreader," published before January 1951 by Deere & Co., Moline, Ill., and numbered A525–48–9; pages 1, 12, 13.

Stone, A. A., et al.: Machines for Power Farming, New York, John Wiley, 1957, page 304.